Oct. 27, 1964 A. F. CONTO 3,154,092
CONTROL SYSTEM FOR A PUMP
Filed Feb. 24, 1961
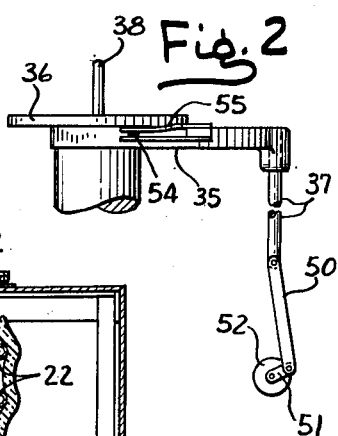
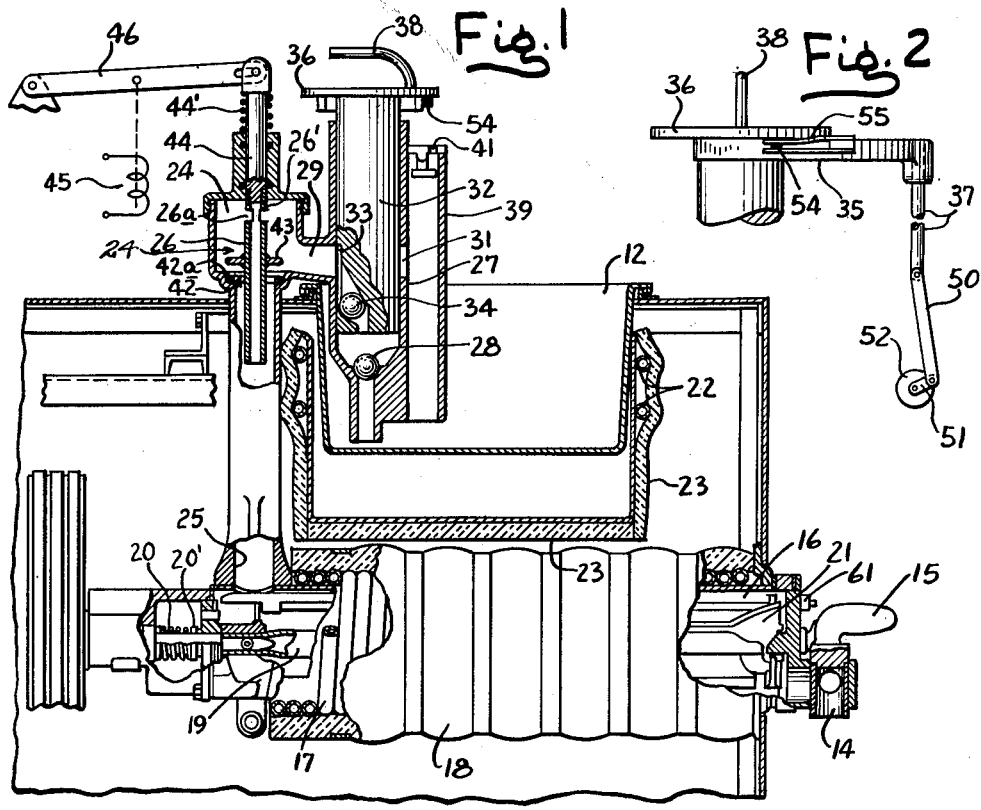
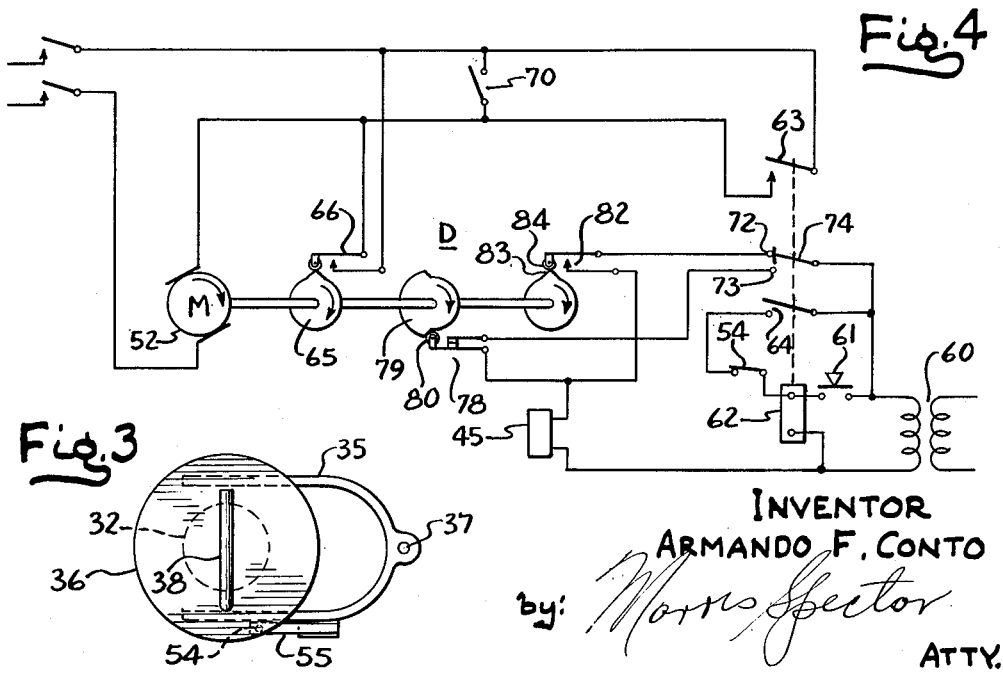
INVENTOR
ARMANDO F. CONTO
by: Morris Spector
ATTY.

United States Patent Office 3,154,092
Patented Oct. 27, 1964

3,154,092
CONTROL SYSTEM FOR A PUMP
Armando F. Conto, Chicago, Ill., assignor to Freez-King Corporation, Chicago, Ill., a corporation of Illinois
Filed Feb. 24, 1961, Ser. No. 91,461
10 Claims. (Cl. 137—209)

This invention is an improvement in the pumping system shown and described in may Patent #2,882,827 of April 21, 1959, and in patent to Woodruff #2,777,393.

The machine of the present invention, like those of the two above-mentioned patents, is one for producing a frozen custard. The machine has a freezing chamber from which variable amounts of the frozen product are withdrawn at random and to which corresponding amounts of replacement supply materials are to be delivered. Reference may be had to my above patent for a more complete description of the present machine.

It is an object of the present invention to provide a machine of the above character wherein the flow of mix into the freezing chamber can be controlled to a high degree of accuracy, so that even small amounts may be delivered thereto at a time and independent of the consistency of the mix, and wherein large mix-flow passages may be provided.

It is further object of this invention to provide an improved electric control system for a machine of this type which reduces the amount of equipment that is exposed to mix product and therefore requires frequent cleaning.

The attainment of the above and further objects of the present invention will be apparent from the following specification taken in conjunction with the accompanying drawing forming a part thereof.

In the drawings:

FIG. 1 is a partial vertical sectional view of a custard freezing machine to which the present invention has been applied;

FIG. 2 is a diagrammatic side view of the piston and the means for actuating same;

FIG. 3 is an enlarged top plan view of the pump piston and supporting means therefor; and FIG. 4 is a circuit diagram of the pump motor controller circuit.

Reference may now be had more particularly to the drawings wherein like reference numerals designate like parts throughout.

The frozen custard machine shown in FIG. 1 is housed in a suitable cabinet and includes a storage chamber 12 closed by a suitable cover, not shown, into which storage chamber the liquid mix is to be placed, and includes a spigot comprising a hollow plug type nozzle 14, manually controlled by a handle 15, through which nozzle the frozen custard flows.

As best seen in FIG. 1, the mechanism includes a freezing container 16 mounted on a horizontal axis and cooled by refrigerating coils 17 wrapped around it. The container and coils may be insulated by a covering 18 and may contain mechanism for beating air into the mix including a rotatable beater including a shaft 19 extending axially through the container and carrying a series of scrapers or paddles 21. The beater is driven through a shaft 20 sealed by a seal 20' by means of an electric motor or other suitable power mechanism not shown.

In the operation of this machine, liquid mix is fed into the container 16 and is whipped by the beaters or paddles 21 while being cooled by the refrigerating coils. The completed product which is a relatively stiff although still fluent material is withdrawn by opening the valve 14 as desired. The withdrawals may be relatively small quantities as, for example, in serving ice cream cones or filling small containers, or may be in relatively large quantities and may be substantially continuous during busy periods. It is desired to maintain a substantially constant quantity of material in the freezing container at all times and not to withdraw it for storage before serving since its quality and flavor are altered by storage. It is therefore essential for the proper operation of machines of this type that replacement mix be supplied to the freezing container at substantially the maximum rate at which it can be frozen, ready for serving, yet not to overfill the freezing container since a certain minimum air space is necessary.

Liquid mix to be supplied to the freezing container is held in a storage chamber 12 which is preferably cooled by refrigerating pipes 22 and is insulated by surrounding insulation 23. The mix in the storage chamber 12, which is in liquid condition, is pumped therefrom into a chamber 24 from which it ultimately flows through the port 42 of an electrically operated valve 26' to and through a vertical conduit 25 that leads to the inlet side of the freezing container 16. The valve 26' has an open ended tubular valve stem 26 that connects the upper part of the supply chamber 24 with the freezing container to equalize the pressure therein at all times, even during a feeding operation.

The liquid mix is pumped from the storage chamber into the supply chamber, in the embodiment shown, by a reciprocating piston pump which develops a maximum pressure per square inch equal to the weight of the piston divided by its area. The pump, as shown, is a vertical cylinder 27 having an inlet opening at its bottom communicating through a check valve 28 with the storage chamber. The cylinder is formed with a port 29 at one side communicating with the supply chamber 24 and at its other side is formed with a vent port 31 whose lower edge is approximately at the level of the bottom of the supply chamber 24. A piston 32 is slidable vertically in the cylinder between an upper or extended position and a lower or retracted position. The piston is formed with a passage connecting its bottom surface with a side port 33 therein which registers with the port 29 during the suction and discharge portions of the piston stroke. An upwardly opening check valve 34 is provided in this passage to prevent downward flow of material through the piston.

The piston is operated by a constant speed electric motor at any desired rate, say, one complete reciporcation each fifteen seconds. For each cycle of operation the piston is raised by a yoke member 35 engaging the lower side of a plate 36 that is secured to the piston. The yoke member is mounted on a vertically guided rod 37 (FIG. 3), which may be operated by a crank, cam, or the like, driven by suitable electric motor or other means. When the yoke is lowered the piston follows, under its own weight, acting as a displacement pump to force the mix from the cylinder space up through the piston valve and port into the supply chamber. For ease in cleaning the piston is designed so that it may be lifted out of the cylinder by a handle 38. When the valve or spigot 14 is closed, the interior of the freezing container and the connected pipe 25 and the supply chamber 24 are closed off from the atmosphere except through the vent port 31. This normally maintains the system at atmospheric pressure. However, when the piston descends and covers the vent port 31 that space is no longer open to atmosphere and therefore the pressure therein which was atmospheric pressure at the instant that the piston closed the vent 31 now commences to rise as the piston forces the mix past the valve 34 and into the supply chamber 24.

In operation of the device as so far described the freezer container 16 will contain only air at the start of service and will contain a quantity of frozen product and some measure of air at all other times. When the piston 32 is elevated, the vent 31 is uncovered to vent the supply chamber and freezing chamber to atmosphere through a vent tube 39 having a vented cover 41 therein. At this time, any mix that may be in the supply chamber will flow therefrom across the cylinder and out the vent port 31 to return to the storage chamber through the tube 39. During upward travel of the piston liquid mix from the storage chamber will be drawn into the cylinder so that it will be filled to the lower edge of the vent port 31, when the piston is in its uppermost position. As the piston starts to lower, it will close the vent port 31 and will force liquid past the check valve 34 and through the ports 33 and 29 into the supply chamber 24. Preferably, mix is added to the freezing container in small batches with a minimum amount of recirculation. Excessive recirculation tends to churn the mix, which is undesirable.

The valve stem 26 extends through the port 42 that communicates between the chamber 24 and the vertical conduit 25. The port is surrounded by an O-ring 42a, of synthetic or natural rubber, that extends above the upper inner surface of the bottom of the chamber 24 and provides a seat for a valve disc 43 that is carried by and is sealed to the valve stem 26. The valve stem 26 is hollow, as previously stated, and opens at its lower end in the freezing container 16, the upper end being open as indicated at 26a into the chamber 24. The upper end of the valve stem 26 is suitably connected to a rod 44 and passes through a suitable air seal through the top of the chamber 24. A spring 44' constantly urges the rod 44 upwardly, thus biasing the valve stem 26 to its valve open position. It is actuated in the reverse direction by an electromagnet 45 that acts through a connecting rod 46 that is pivoted about a fixed pivot at the left-hand end as seen in FIG. 1 and at its right-hand end bears against a yoke at the upper end of the rod 44.

The action of the system thus far described is such that when the pump commences its downward or discharge stroke, the magnet 45 is energized, in a manner to be more fully set forth herein, to move the valve stem 26 to its valve close position. Downward movement of the pump piston causes mix to flow into the chamber 24. No mix will flow from this chamber into the container 16 until approximately the time when the piston is at the bottom of its stroke. At this time, in normal operation of the system, the magnet 45 is deenergized, allowing the spring 44' to raise the valve stem to its valve open position so that the mix within the chamber 24 flows into the container 16. When the pump piston reaches the top of its stroke, it uncovers the vent port 31, bringing the air pressure in the chamber 24 and pipe 25 back to atmospheric pressure and, a short time thereafter, when the pump piston commences its downward stroke, it again causes the establishment of an operating circuit for the magnet 45, again closing the valve, and after the piston passes below the bottom of the vent 31, it again forces mix into the chamber 24. This cycle of action continues until there is a proper quantity of mix in the freezing container. At this time, therefore, there is a fixed and previously calculated quantity of air above the mix in and extending into the supply chamber 24. Thereafter, when the pump piston moves toward its lowered position, it again compresses the air in the supply chamber 24 by an amount equal to the pump displacement. The resulting rise in pressure, due to the precalculated volume of air in the supply chamber in relation to the stroke and weight of the piston, now reaches a value such that the back pressure on the bottom of the piston is sufficient to support the weight of the piston, before the piston has reached the bottom of its stroke. The descent of the piston therefore stops, the piston remaining stationary as the yoke 35 continues to descend. Once the yoke separates from the piston an electric circuit is prepared which will stop the motor and stop the movement of the yoke after the yoke completes its cycle and reaches its fully elevated position. An explanation will now be given of how this is accomplished.

The vertical drive rod 37 is reciprocated by a connecting rod 50 which is turned by a crank 51 operated by an electric motor 52. The yoke 35 carries a pair of piston controlled switch contacts 54 at the end of a pair of springs. The springs carrying the switch contacts are mounted on the yoke and they normally are open by the spring action of the upper leaf 55 that supports the upper switch contact 54. This leaf is located in such a position that when the yoke supports the piston the lower side of the plate 36 bears against the spring 55 and closes the contacts 54, as is illustrated in FIGS. 2 and 3. When the yoke recedes from the piston, that is, by the descent of the yoke while the piston is supported by back pressure at its under face, the spring 55 opens the contacts 54.

The motor 52 may be operated from a 220 volt line under control of a low voltage control circuit that is supplied with a low voltage from a step down transformer 60. A push button switch 61, when momentarily closed, completes a circuit for an electromagnetic relay switch 62. The switch 62 operates a set of motor control contacts 63 to complete a circuit for the electric motor 52, which thereupon commences to operate. At its contact 64 the electromagnetic switch 62 now establishes a holding circuit for itself through the contacts 54, so that the relay 62 remains operated even after the push button switch 61 is released. The motor 52 reciprocates the pump piston, as previously described. It also operates a cam 65 that closes a set of switch contacts 66 that establish a holding circuit for the motor. The cam 65 is in such a position that it permits opening of the switch contacts 66 only when the motor is in such a position that the yoke 35 has raised the piston to its uppermost position. Thus, during each cycle of rotation of the motor the contacts 66 open every time the yoke reaches its upper position. As long as the relay 62 remains operated, the opening of the contacts 66 is of no effect, and the motor 52 continues to rotate, and the pumping action continues until the piston 32, in its descent, encounters a pressure sufficient to support the piston, as previously described. Further descent of the yoke 35 causes it to separate from the plate 36, thus opening the switch contacts 54, thereby opening the holding circuit for the winding of the electromagnetic switch 62. This switch now opens, and at its contacts 64 further opens its holding circuit, so that upon subsequent reclosure of the contacts 54 the electromagnetic switch is not reoperated. At the contacts 63, now open, the relay has opened one of the circuits for the motor. The motor circuit remains complete through the contacts 66. The motor thus continues to operate until it raises the yoke 35 and the piston to their upper positions, at which time the contacts 66 open and, the contact 63 being already open, the motor circuit is broken and the motor stops. Thus, the motor always stops with the piston in its elevated position where the piston uncovers the vent port 31 (FIG. 1).

The switch 61 is mounted at the front of the machine where it is readily accessible. It may, if desired, be mounted in the path of turning of the handle 15 so that every time the handle 15 is turned to open the valve 14 the handle will close the switch 61, although the switch 61 may also be closed manually without turning of the handle 15. If desired, the switch 61 may be located in a position where it is not actuated by the handle 15 so that the switch 61 is operated independently of the handle 15.

An auxiliary manual switch 70 is provided for operating the motor 52 whenever desired independently of the operation of the starting switch 61. When the switch 70 is closed, the motor circuit is completed through that switch and the motor operates. Upon opening of the switch 70, the motor 52 then merely completes its cycle, its circuit being completed through the cam operated switch contacts 66, so that the motor will again stop under control of the cam contacts 66 with the yoke 35 in its raised position.

The relay switch 62 is provided with another pair of contacts 72 and 73 controlled by a movable contact 74. When the winding of the switch 62 is not energized, the movable contact 74 engages the contact 72. Upon energization of the winding of the switch 62, the movable contact 74 first moves into engagement with the contact 73 and then out of engagement with the contact 72. The pump motor 52 operates a switch 78 through a cam 79 and follower 80, and a switch 82 through a cam 83 and a follower 84. When the motor 52 is in its off position and the pump piston in its elevated position, then switch contacts 78 are closed and the switch contacts 82 are open. In FIG. 4 the motor shaft is assumed to be rotating in the direction indicated by the arrows. After the motor has operated through an angle of approximately five degrees from the commencement of the downstroke of the piston 32, the contacts 82 close, and remain closed until the piston has approximately returned to its uppermost position. The contacts 78 remain closed during the downward stroke of the piston and open after the motor 52 has operated a few degrees beyond that required to start the piston in its upward movement. They then remain open until the piston reaches almost its top position whereupon they close. Thus, one or the other of the two switches 78 and 82 is always closed. During the bulk of the downstroke of the piston both switches 78 and 82 are closed. These switches, through the switch contact 72 or 73, as the case may be, of the electromagnetic relay 62, control the circuit for the electromagnet 45 that operates the valve 26.

Thus, upon energization of the relay 62 that relay, at its contact 73, 74, establishes an operating circuit for the magnet 45. That circuit is under control of the contacts 78. At this time the contacts 82 play no part. During the down stroke of the pump piston, the electromagnetic winding 45 is energized and, therefore, the valve disc 43 is in its closed position. During the bulk of the upstroke of the piston, the switch contacts 78 are open and, therefore, the magnet 45 is deenergized and the valve disc 43 is in its valve open position. This continues so long as the pump in each cycle of its operation does not raise the pressure of the air in the container 16 an amount sufficient to stop the descent of the pump. However, when that happens and the contacts 54 open, resulting in release of the starting relay 62, the control of the circuit of the electromagnetic winding 45 is transferred by the relay contact 74 from the contact 73 to the contact 72, thereby transferring the control of the magnet from the switch 78 to the switch 82. The switch 82 maintains the circuit of the magnet 45 closed until the piston reaches approximately its top position. As the piston moves upwardly to uncover the vent port 31, the amount of mix within the chamber 24 flows back into the storage chamber 12. Thereafter, as the piston 32 continues its ascent, and when it reaches approximately the top of its travel, the contacts 82 open, thereby opening the circuit for the winding 45, causing the electromagnetically operated valve disc 43 to open its valve preparatory for a repetition of this cycle when the manually operable switch 61 is again operated.

In compliance with the requirements of the patent statutes, I have herein shown a preferred embodiment of the present invention. What is considered new and sought to be secured by Letters Patent is:

1. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, means forming an air communication passageway opening on both sides of the valve to maintain equality of air pressure on both sides of the valve, a pump for periodically pumping discrete amounts of liquid from a supply source into said chamber, means responsive to the operation of the pump for periodically completing and interrupting an operating circuit for the electromagnetic valve for periodically closing the valve during the period when a discrete amount of liquid is pumped into said chamber and periodically opening the valve after substantially all of the discrete amount has been pumped into said chamber.

2. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a pump for periodically pumping discrete amounts of liquid from a supply source into said chamber, means responsive to the operation of the pump for periodically completing and interrupting an operating circuit for the electromagnetic valve for periodically closing the valve during the period when a discrete amount of liquid is pumped into said chamber and periodically opening the valve after substantially all of the discrete amount has been pumped into said chamber.

3. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, means forming an air communication passageway opening on both sides of the valve to maintain equality of air pressure on both sides of the valve, a pump for periodically pumping discrete amounts of liquid from a supply source into said chamber, means responsive to the operation of the pump for periodically completing and interrupting an operating circuit for the electromagnetic valve for periodically closing the valve during the period when a discrete amount of liquid is pumped into said chamber and periodically opening the valve after substantially all of the discrete amount has been pumped into said chamber, whereby liquid enters the chamber between a valve closing operation and the following valve opening operation to create an increase in the air pressure in the container, and means responsive to a predetermined rise in air pressure in the container for rendering ineffective the pumping action.

4. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve, a pump for periodically pumping discrete amounts of liquid from a supply source into said chamber, means responsive to operation of the pump for periodically completing and interrupting an operating circuit for the electromagnetic valve for periodically closing the valve during the period when a discrete amount of liquid is pumped into said chamber and periodically opening the valve after substantially all of the discrete amount has been pumped into said chamber, whereby to create an increase in the air pressure in the container, and means responsive to a predetermined rise in air pressure in the container for rendering ineffective the pumping action.

5. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a pump for periodically pumping discrete amounts of liquid from a supply source into said chamber, means responsive to the operation of the pump for periodically completing and interrupting an operating circuit for the electromagnetic valve for periodically closing the valve during the period when a discrete amount of liquid is pumped into said chamber and periodically opening the valve after substantially all of the discrete amount has been pumped into said chamber, whereby to create an increase in the air pressure in the container, means responsive to a predetermined rise in air pressure in the container for rendering ineffective the pumping action, and means for returning to the supply source liquid remaining in said chamber when the pump is rendered ineffective by said last named means and for opening the container to atmospheric pressure.

6. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, means forming an air communication passageway opening on both sides of the valve, a pump for periodically pumping discrete amounts of liquid from a supply source into said chamber, so that liquid entering the chamber creates an increase in the air pressure in the container, means responsive to operation of the pump for completing an operating circuit for closing the valve approximately at the commencement of each pumping period, and means responsive to a predetermined rise in air pressure in the container for rendering ineffective the pumping action and thereafter opening the valve.

7. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a reciprocating piston pump for pumping liquid from a supply source into said chamber, means responsive to the commencement of each pumping cycle in the reciprocation of the pump for completing an operating circuit for the electromagnetic valve for closing the valve, means responsive to a predetermined movement of the pump piston after the commencement of the pumping cycle in the reciprocation of the pump piston for changing the valve operating circuit to cause opening of the valve so that liquid entering the chamber between a valve closing operation and the following valve opening operation creates an increase in the air pressure in the container, and means responsive to a predetermined rise in air pressure in the container for rendering ineffective the pumping action.

8. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a reciprocating piston pump for pumping liquid from a supply source into said chamber, means responsive to the commencement of each pumping cycle in the reciprocation of the pump for completing an operating circuit for the electromagnetic valve for closing the valve, means responsive to a predetermined movement of the pump piston after the commencement of the pumping cycle in the reciprocation of the pump piston for changing the valve operating circuit to cause opening of the valve so that liquid entering the chamber between a valve closing operation and the following valve opening operation creates an increase in the air pressure in the container, means responsive to a predetermined rise in air pressure in the container for rendering ineffective the pumping action, and means for returning to the supply source liquid remaining in said chamber when the pump is rendered ineffective by said last named means and for opening the container to atmospheric pressure.

9. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a reciprocating piston pump for pumping liquid from a supply source into said chamber, means responsive to the commencement of each pumping cycle in the reciprocation of the pump for completing an operating circuit for the electromagnetic valve for closing the valve, means responsive to a predetermined movement of the pump piston after the commencement of the pumping cycle in the reciprocation of the pump piston for changing the valve operating circuit to cause opening of the valve so that liquid entering the chamber between a valve closing operation and the following valve opening operation creates an increase in the air pressure in the container, means responsive to a predetermined rise in air pressure in in the container for rendering ineffective the pumping action during the remainder of the pump operating cycle following said predetermined rise in air pressure in the container, and means for stopping the pump upon completion of the cycle in which it is moving at the time of said predetermined rise in air pressure.

10. Apparatus for maintaining a selected quantity of liquid in an enclosed space including in combination, a closed container and a supply chamber therefor constituting a closed space for housing said liquid and air, means forming a port between said container and said chamber, an electromagnetic valve controlling said port, said valve including a valve seat and a valve stem carrying a valve disc, said valve stem having means forming an air communication passageway therethrough opening on both sides of the valve disc to maintain equality of air pressure on both sides of the valve, a reciprocating piston pump for pumping liquid from a supply source into said chamber, means responsive to the commencement of each pumping cycle in the reciprocation of the pump for completing an operating circuit for the electromagnetic valve for closing the valve, means responsive to a predetermined movement of the pump piston after the commencement of the pumping cycle in the reciprocation of the pump piston for changing the valve operating circuit to cause opening of the valve so that liquid entering the chamber between a valve closing operation and the following valve opening operation creates an increase in the air pressure in the container, means responsive to a predetermined rise in air pressure in the container for rendering ineffective the pumping action during the remainder of the pump operating cycle following said predetermined rise in air pressure in the container, means for stopping the pump upon completion of the cycle in which it is moving at the time of said predetermined rise in air pressure, and means for returning to the supply source liquid remaining in said chamber when the pump is rendered ineffective by said last named means and for opening the container to atmospheric pressure.

References Cited in the file of this patent

UNITED STATES PATENTS

| | | |
|---|---|---|
| 307,220 | Peters | Oct. 28, 1884 |
| 1,169,418 | Morris | Jan. 25, 1916 |
| 2,499,149 | Lippold | Feb. 28, 1950 |
| 2,612,180 | Schwarzkopf | Sept. 30, 1952 |
| 2,777,393 | Woodruff | Jan. 15, 1957 |
| 2,882,827 | Conto | Apr. 21, 1959 |